Feb. 5, 1924.
T. R. BRADFORD
CHILD'S CART
Filed May 2, 1922
1,482,506
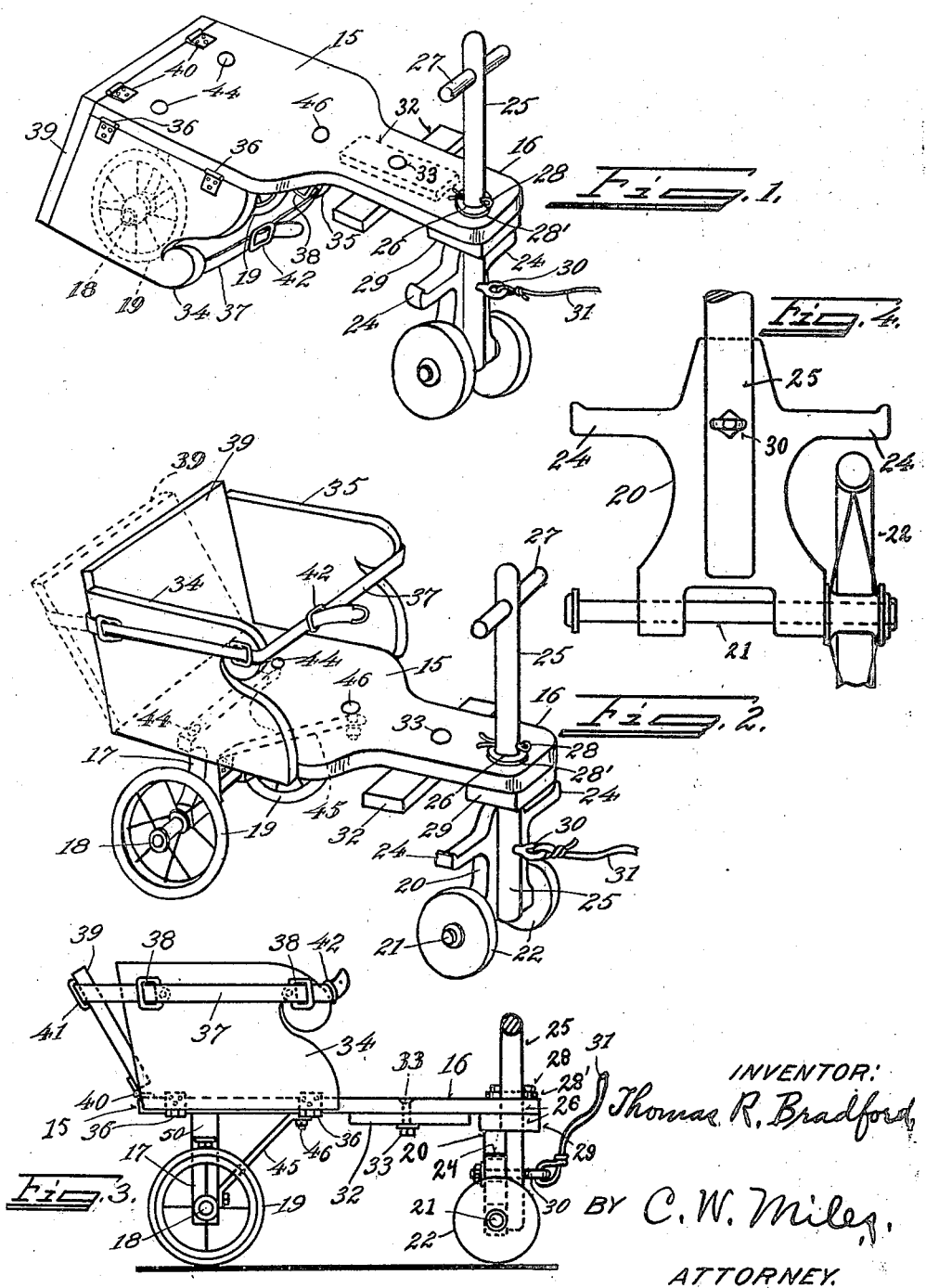
INVENTOR:
Thomas R. Bradford
BY C. W. Miles,
ATTORNEY.

Patented Feb. 5, 1924.

1,482,506

UNITED STATES PATENT OFFICE.

THOMAS R. BRADFORD, OF STURGIS, MICHIGAN.

CHILD'S CART.

Application filed May 2, 1922. Serial No. 557,982.

*To all whom it may concern:*

Be it known that I, THOMAS R. BRADFORD, a citizen of the United States, residing at Sturgis, in the county of St. Joseph and State of Michigan, have invented certain new and useful Improvements in Children's Carts, of which the following is a specification.

My invention relates to improvements in child's carts. One of its objects is to provide an improved cart having sides and a back hinged thereto so as to adjust the sides and back to positions above the seat or so that the sides and back will occupy depending positions relative to the seat. Another object is to provide a cart with hinged sides and back and a strap connected to the sides and back to hold the sides and back to different adjusted positions. Another object is to provide improved means to guide and direct the cart. Another object is to provide an improved cart capable of being shipped in condensed form and readily assembled in operative position. My invention also comprises certain details of form, combination and arrangement, all of which will be fully set forth in the description of the accompanying drawings in which:

Fig. 1, is a perspective view of a cart embodying my improvements, with the sides and back in depending positions, Fig. 2, is a perspective view of the same showing the sides and back in position above the seat.

Fig. 3, is a side elevation showing another position of the back and sides relative to the seat.

Fig. 4, is a detail of the forward wheel supporting member.

The accompanying drawings illustrate the preferred embodiment of my invention in which 15 represents the seat having a narrower tongue 16 projecting forward therefrom. The seat 15 and tongue 16 are supported respectively upon a rear bolster 17 rear axle 18 and rear wheels 19, and a forward bolster 20 forward axle 21 and forward wheels 22. The forward bolster 20 is preferably provided with side projections 24 at opposite sides thereof adapted to serve as foot rests, and with a cylindrical vertical stem 25 passing through a perforation 26 in the tongue 16 and having at its upper end a cross bar or handle bar 27 to enable the stem 25 to be rotated by hand to turn the forward wheels and guide the cart. A cotter pin 28 inserted through the stem 25 above the washer 28' resting on the tongue 16 serves to hold the stem 25 in place relative to the tongue 16 and with the upper face of the bolster 20 in contact with the under face of the tongue 16, or preferably in contact with the under face of a perforated block 29 attached to the under face of the tongue 16 to provide a longer journal box 26 for the stem 25 than would otherwise be available. An eye-bolt 30 is preferably employed as the chief means to unite the stem 25 to the bolster 20, and which may be supplemented by glue, screws, or nails. The eyebolt 30 serves as a convenient means to attach a draw string or tongue 31 or similar member by means of which the cart may be drawn by a person walking in advance of the cart. The axle 21 for the front wheels 22 is offset to the rear of the journal box 26 to secure a castor effect for the wheels 22 and cause them to automatically turn and track in the direction in which the cart is drawn. If desired an additional foot rest 32 suited to the use of younger children may be pivotally attached by a bolt 33 to the under side of the tongue 16 so as to be adjusted into an idle position in line with and under the tongue as shown in Fig. 3 or into position for use transversely to the tongue 16 as shown in Fig. 1.

The side members of the cart 34 and 35 are each attached to the edges of the seat by means of hinges 36 one leaf of each of which hinges is attached to the inside face of one of the side members 34 or 35 while the opposite leaf of each of said hinges 36 is attached to the under face of the seat 15 near its side edge, which enables the sides to hang down from and at the sides of the seat as shown in Fig. 1 or to be held up at the sides of the seat as shown in Figs. 2 and 3, preferably by means of a strap 37 passing through strap-guides 38 attached to one face of the respective side members 34 and 35.

The back member 39 is hinged to the rear edge of the seat 15 by means of hinges 40. One leaf of each of said hinges 40 is attached to the upper face of the seat 15 near the rear edge thereof while the opposite leaf of each of said hinges 40 is attached to the outer or rear face of the back member 39 to enable the back member to hang down from the rear of the seat 15 as shown in Fig. 1, or to be supported in various upright and inclined positions above the face of the seat 15 as indicated in Figs. 2 and 3, being preferably supported in the desired position by the strap 37 which passes through strap-guides 41 attached to one face of the back member 39.

The side and back members are variously adjustable to enable the cart to be employed with children of various ages and for different purposes. For instance as shown in Figs. 2 and 3, children of different sizes and ages may be seated or reclined in the cart with or without cushions and covering robes and held in place by the strap 37 adjustably secured by a buckle 42 at the front of the cart, and the cart drawn or pushed or guided by the handle bars 27 while as shown in Fig. 1, the cart may be used for coasting, as a foot propelled vehicle, or as a hand drawn vehicle. With the back and side members in their upper positions the strap 37 is designed to be adjusted relative to its buckle 42, so as to secure any desired inclination of the back to provide either reclining or sitting positions for the occupant. When the side and back members are in their lower position, the strap may be tightened so as to limit the movement of the side and back members and to hold them rigidly in position relative to the seat 15.

The rear bolster 17 is of substantially the same outline as the forward bolster 20, except that members 50 corresponding to the members 24 of the front bolster engage against the under face of the seat member 15 and are rigidly secured thereto by means of bolts 44. A metal brace 45 is attached at its lower end to the bolster 17 and at its upper end by a bolt 46 to the seat 15. Solid wooden wheels, or metal, or rubber tired wheels, may be employed interchangeably on either front or rear axle as may be desired.

The article herein shown and described is capable of considerable modification without departing from the spirit of my invention.

What I claim is:

1. A child's cart comprising a seat supported upon a rear axle and wheels and a forward axle and wheels, a steering bar to steer the forward wheels, side members and a back member hinged to the sides and rear end of the seat and adjustable relative to said seat to form a variable child supporting receptacle above said seat, strap loops carried by said respective side and back members, a strap threaded through said strap loops and having its ends adjustably united across the front of the seat to retain the side and back members in position and to secure a child in position on the seat.

2. A child's cart comprising a seat supported upon a rear axle and wheels and a forward axle and wheels, a steering bar to steer the forward wheels, side members and a back member hinged to the sides and rear end of the seat and movable from depending positions to upwardly projecting positions relative to said seat, strap loops carried by said respective side and back members, a strap threaded through said strap loops and having its ends adjustably united across the front of the side members to retain said side and end members in position relative to said seat either below or above said seat.

3. A child's cart comprising a seat supported upon a rear axle and wheels and a forward axle and wheels, side members and a black member hinged to the side and rear end of the seat and movable from depending positions to upwardly projecting positions relative to said seat, strap loops carried by said respective side and back members, a strap threaded through said strap loops and having its ends adjustably united across the front of the side members to retain said side and back member in position relative to said seat either below or above said seat.

4. A child's cart comprising a seat having a relatively narrow forwardly projecting tongue, a bolster block attached to the under face of the forward end of said tongue, said seat being supported upon a rear axle and wheels, and said seat tongue and bolster block being supported upon a forward axle and wheels, a steering bar journaled in a vertical bearing in said bolster block and tongue to steer the forward wheels relative to said seat and a foot rest forward of and below said seat.

5. A child's cart comprising a seat having a relatively narrow forwardly projecting tongue, said seat being supported upon a rear axle and wheels, and said seat tongue being supported upon a rotatably adjustably steering post and castor wheels mounted at the lower end of said steering post, and means attached to the forward portion of said steering post to enable said cart to be drawn forwardly.

In testimony whereof I have affixed my signature.

THOMAS R. BRADFORD.